(12) United States Patent
Vest

(10) Patent No.: US 11,484,126 B1
(45) Date of Patent: Nov. 1, 2022

(54) NECK REST

(71) Applicant: LaToya Vest, Priarieville, LA (US)

(72) Inventor: LaToya Vest, Priarieville, LA (US)

(*) Notice: Subject to any disclaimer, the term of this patent is extended or adjusted under 35 U.S.C. 154(b) by 249 days.

(21) Appl. No.: 16/887,743

(22) Filed: May 29, 2020

(51) Int. Cl.
A47C 31/00 (2006.01)
A47G 9/10 (2006.01)
A47C 7/38 (2006.01)
B60N 2/879 (2018.01)
B60N 2/882 (2018.01)

(52) U.S. Cl.
CPC .............. A47C 7/383 (2013.01); B60N 2/879 (2018.02); B60N 2/882 (2018.02)

(58) Field of Classification Search
CPC ...... A47C 7/383; B60N 2/882; B60N 2/2851; B60R 22/00; A63H 3/003; A63H 3/02; A63H 3/28; A63H 2200/00
See application file for complete search history.

(56) References Cited

U.S. PATENT DOCUMENTS

| D141,700 S | * | 6/1945 | Raport | D24/199 |
| 4,594,072 A | * | 6/1986 | Cowell | A63H 33/00 |
| | | | | D21/477 |
| 4,595,618 A | * | 6/1986 | Caringer | A63H 3/00 |
| | | | | 446/28 |
| 4,917,607 A | * | 4/1990 | Van Hoose | A63H 3/003 |
| | | | | 446/295 |
| D323,363 S | * | 1/1992 | Ely | D2/639 |
| 5,114,185 A | * | 5/1992 | Reedom | B60R 22/00 |
| | | | | 280/801.1 |
| 5,489,231 A | * | 2/1996 | Leyser | G09B 5/04 |
| | | | | 446/385 |
| D412,583 S | * | 8/1999 | Miller | D24/199 |
| 6,017,094 A | * | 1/2000 | Syiek | B60N 2/882 |
| | | | | 297/DIG. 6 |
| 6,216,298 B1 | | 4/2001 | Oliveira | |
| 6,394,554 B1 | * | 5/2002 | Hingle | B60N 2/882 |
| | | | | 297/DIG. 6 |
| 6,409,271 B1 | * | 6/2002 | Caramanis | B60R 22/00 |
| | | | | 297/181 |
| 6,554,363 B1 | * | 4/2003 | Silva | B60R 22/00 |
| | | | | 297/DIG. 6 |
| 6,739,933 B2 | * | 5/2004 | Taylor | A45F 5/00 |
| | | | | 446/28 |
| 6,773,344 B1 | * | 8/2004 | Gabai | A63H 30/04 |
| | | | | 463/1 |
| 6,848,967 B2 | * | 2/2005 | Kim | A63H 3/02 |
| | | | | 446/369 |

(Continued)

Primary Examiner — Shin H Kim
(74) Attorney, Agent, or Firm — Sanchelima & Associates, P.A.; Christian Sanchelima; Jesus Sanchelima

(57) ABSTRACT

A system for a neck rest including a cushion assembly, a noise assembly and a seat assembly is disclosed. The cushion assembly provides a cushion, being a predetermined stuffed animal, to provide support to the neck of a user while the user sleeps or rests. The cushion includes legs that secure underneath of the chin of the user, with hook and loop fastener. The noise assembly includes a speaker which emits sounds such as sayings, melodies or songs to help soothe and comfort the user as the user falls asleep. The cushion is secured in place onto a seat belt of the seat assembly with a stopper. The stopper being a male and female member which engage one another to keep the cushion positioned properly. The seat belt being on a vehicle or on a car seat.

9 Claims, 5 Drawing Sheets

(56) References Cited

U.S. PATENT DOCUMENTS

| | | | | |
|---|---|---|---|---|
| 6,983,722 B2* | 1/2006 | Tepper | ............... | A01K 15/026 |
| | | | | 446/376 |
| 8,708,415 B2* | 4/2014 | Gabriel | ............... | B60N 2/2851 |
| | | | | 297/181 |
| 8,827,760 B2* | 9/2014 | Ushibo | ............... | A63H 3/003 |
| | | | | 446/268 |
| 9,565,402 B2* | 2/2017 | Veneziano | ............... | H04N 5/2256 |
| 9,808,100 B2* | 11/2017 | Jensen | ............... | A47C 7/383 |
| D829,285 S * | 9/2018 | Dongarra | ............... | D21/596 |
| 2005/0121339 A1* | 6/2005 | Tepper | ............... | A01K 15/026 |
| | | | | 119/707 |
| 2012/0264349 A1* | 10/2012 | Ciampitti | ............... | A63H 3/02 |
| | | | | 446/369 |
| 2013/0117939 A1* | 5/2013 | Moss | ............... | A47G 9/1027 |
| | | | | 5/636 |
| 2013/0344770 A1* | 12/2013 | Gloge | ............... | A63H 33/26 |
| | | | | 446/484 |
| 2019/0374864 A1* | 12/2019 | Cragle | ............... | A63H 3/003 |

* cited by examiner

NECK REST

BACKGROUND OF THE INVENTION

1. Field of the Invention

The present invention relates to a neck rest and, more particularly, to a neck rest that can be removably mounted onto car seats to provide comfort to a child while they sleep.

2. Description of the Related Art

Several designs for neck rests have been designed in the past. None of them, however, include a stuffed animal including legs and arms with hook and loop fasteners, a stopper or locking mechanism for locking the stuffed animal in place and noise making features. The present invention helps to provide comfort to the user while the user sleeps. The neck of the user is supports substantially upright to prevent neck pains or comforts upon waking. Further, the present invention includes noise making features which help to soothe and comfort the user. The noise making features may aid the user in resting or falling asleep more comfortably.

Applicant believes that a related reference corresponds to U.S. Pat. No. 6,216,298 for a travel pillow. Applicant believes that another related reference corresponds to U.S. Pat. No. 8,708,415 for a child head restraint system and methods using the same. None of these references, however, teach of a stuffed animal including legs/arms with hook and loop fasteners, noise making features.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a neck rest which may be removably mounted onto a car seat.

It is another object of this invention to provide a neck rest which helps a user to remain comfortable during sleep in a vehicle.

It is still another object of the present invention to provide a neck rest which helps to soothe and comfort a user during usage.

It is also another object of the present invention to provide a neck rest which can be retrofitted onto existing car seats.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
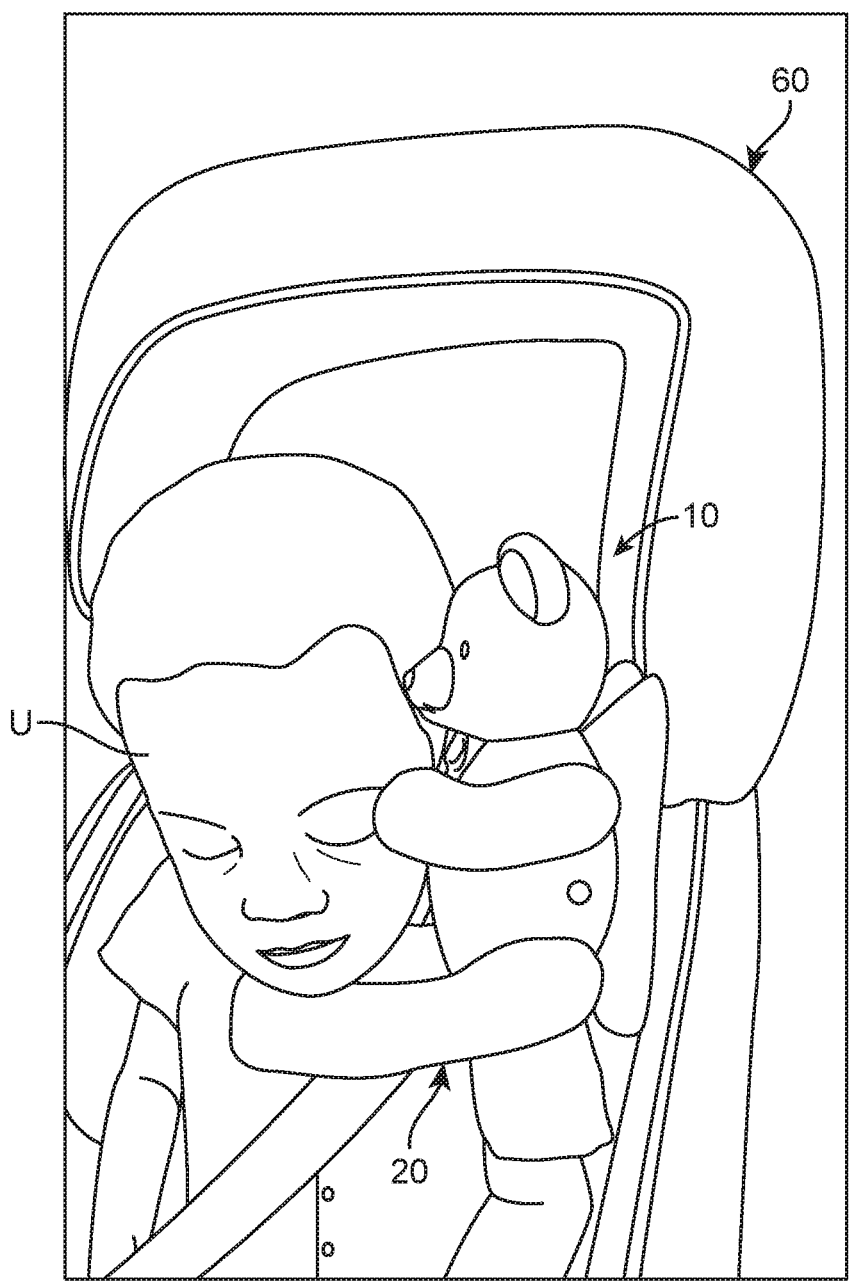
FIG. 1 represents the neck rest 10 in an operational setting mounted to a car seat 62.

Referring now to the drawings, where the present invention is generally referred to with numeral 10, it can be observed that it basically includes a cushion assembly 20, a noise assembly 40 and a car seat assembly 60.

The present invention, a neck rest 10, may be used to provide comfort to a user U such as a child while they sleep during car rides or the like. This helps to prevent neck strains or other bodily discomforts that may result from sleeping in an awkward position. Further, the present invention includes means for soothing and comforting user U during usage of the present invention.

Figure 2:
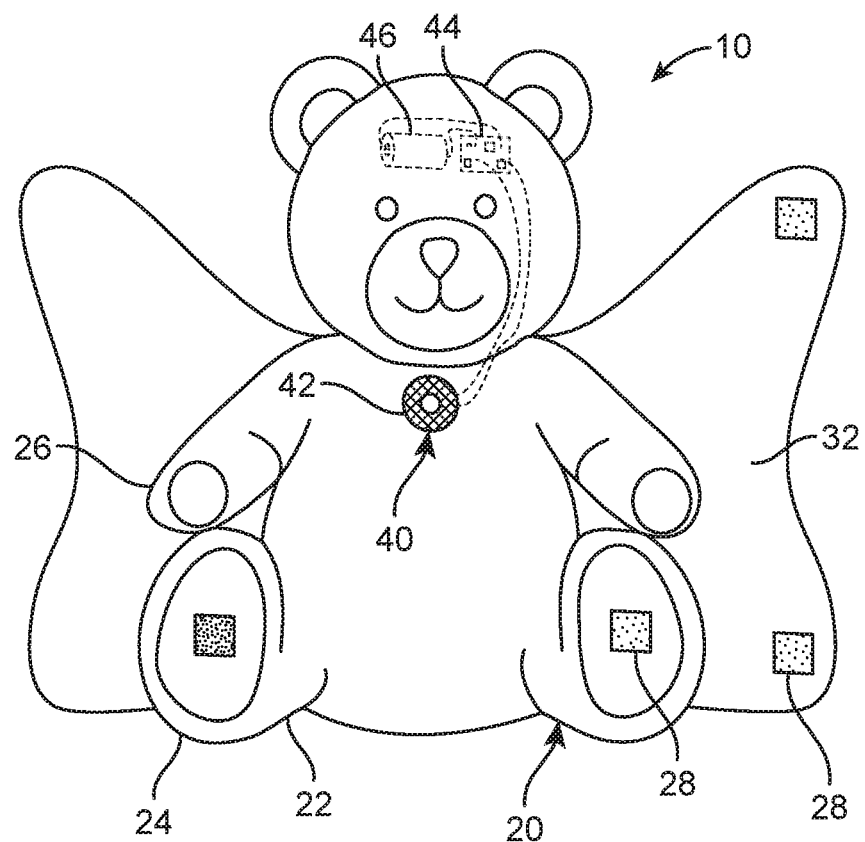
FIG. 2 shows an isometric front view of neck rest 10.
Figure 3:
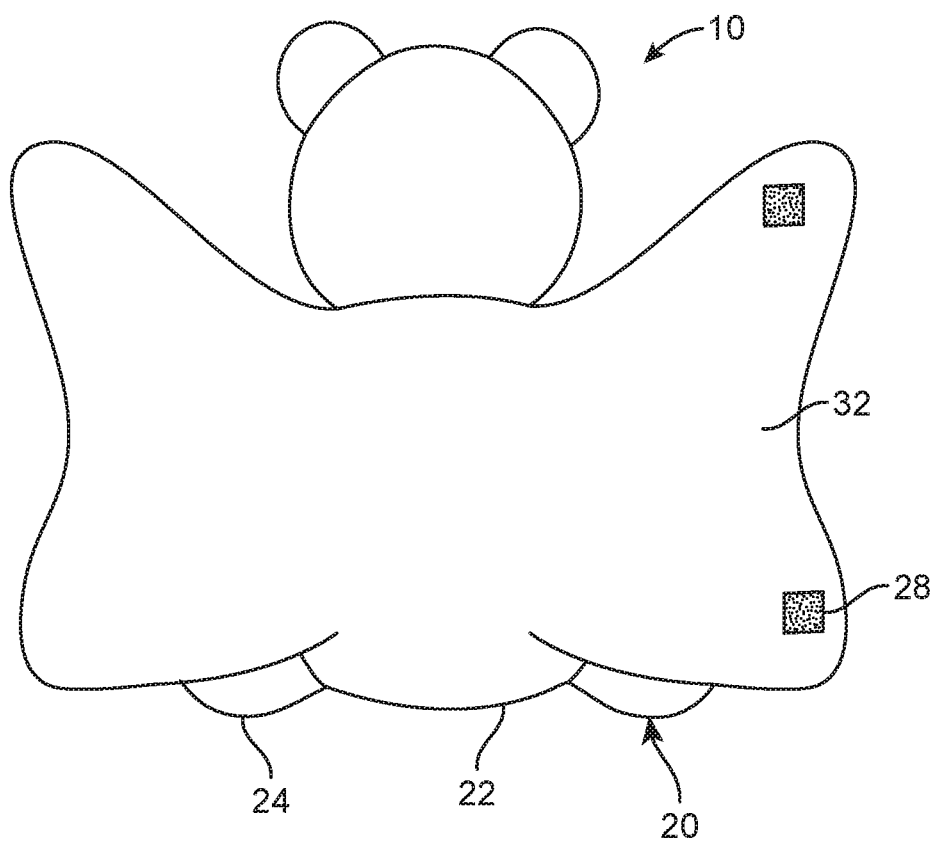
FIG. 3 illustrates an isometric rear view of neck rest 10.

Neck rest 10 may include cushion assembly 20, as best seen in FIGS. 1-3. Cushion assembly 20 may include a cushion 22. It may be preferable that cushion 22 be a predetermined stuffed animal. As such, cushion 22 may have a predetermined shape and dimensions. Preferably, cushion 22 may be plush and made of cotton, wool, polyester, synthetic fiber or other similar materials as known in the art of stuffed toy making. Cushion 22 may preferably be soft to the touch and cushioned. In one embodiment, it may be suitable for cushion 22 to be scented. Cushion 22 may include legs 24 and arms 26. Legs 24 and arms 26 may further provide support to the head of user U during usage, as best seen in FIG. 1. Legs 24 and arms 26 may help to ensure that the head of user U remains in contact and resting on cushion 22. It is to be understood that cushion assembly 20 may further include hook and loop fasteners 28 at predetermined locations. In one embodiment, at a distal end of each of legs 24 may be hook and loop fasteners 28. It is to be understood that it may be suitable for hook and loop fasteners 28 may be at predetermined locations on legs 24. Hook and loop fasteners 28 may help to secure and connect legs 24 together.

It is to be understood that the neck rest 10 may be mounted about the neck and head of user U, as best seen in FIG. 1. The front side of cushion 22 may make direct contact with the head of user U to provide support to user U. It can be seen that legs 24 may be interconnected together underneath the chin of user U in order to secure neck rest 10 to user U. Preferably, legs 24 may be secured together with hook and loop fasteners 28 which correspond with one another. Neck rest 10 may be mounted onto the shoulders of user U once legs 24 have been used to attach the present invention to user U. It is to be understood that in alternative embodiments, it may be suitable for other fastening members other than hook and loop fasteners 28 to be used instead such as buttons, snap buttons, adhesives, sewing, and the like.

As best seen in FIGS. 2 and 3, cushion 22 may include folding portions 32. Folding portion 32 may be shaped like wings, in one embodiment. It is to be understood that folding portions 32 may extend outwardly and away from cushion 22. Preferably, folding portion 32 may extend from the lateral sides of cushion 22 as seen in FIGS. 2 and 3. Folding portions 32 may be integral to cushion 22, in the preferred embodiment. Folding portions 32 may also be mounted onto cushion 22. It is to be understood that folding portion 32 may have an expanded configuration and a folded configuration. In the folded configuration, folding portions 32 may engage and secure to a seat belt 64 during usage to further secure the present invention in place. Folding portions 32 may be folded rearwardly and overlap one another. It may be suitable for one of folding portions 32 to include hook and loop fasteners 28 on a front side thereof. While another of folding portions 32 may include hook and loop fasteners 28 on a rear side thereof. One of folding portions 32 with hook and loop fasteners 28 on the front side may be folded rearwardly and over seat belt 64 first. Subsequently, the remaining of folding portions 32 with hook and loop fasteners 28 on the rear side, may then be folded rearwardly and over the folded of folding portions 32 and seat belt 64. Hook and loop fasteners 28 on the front of one of folding portions 32 may correspond with hook and loop fasteners 28 on the rear of one of folding portions 32. Thereby resulting in folding portions 32 being secured together to further secure neck rest 10 to seat belt 64 with hook and loop fasteners 28. It may be preferable to secure neck rest 10 to seat belt 64 before user U is secured to neck rest 10.

Figure 4:
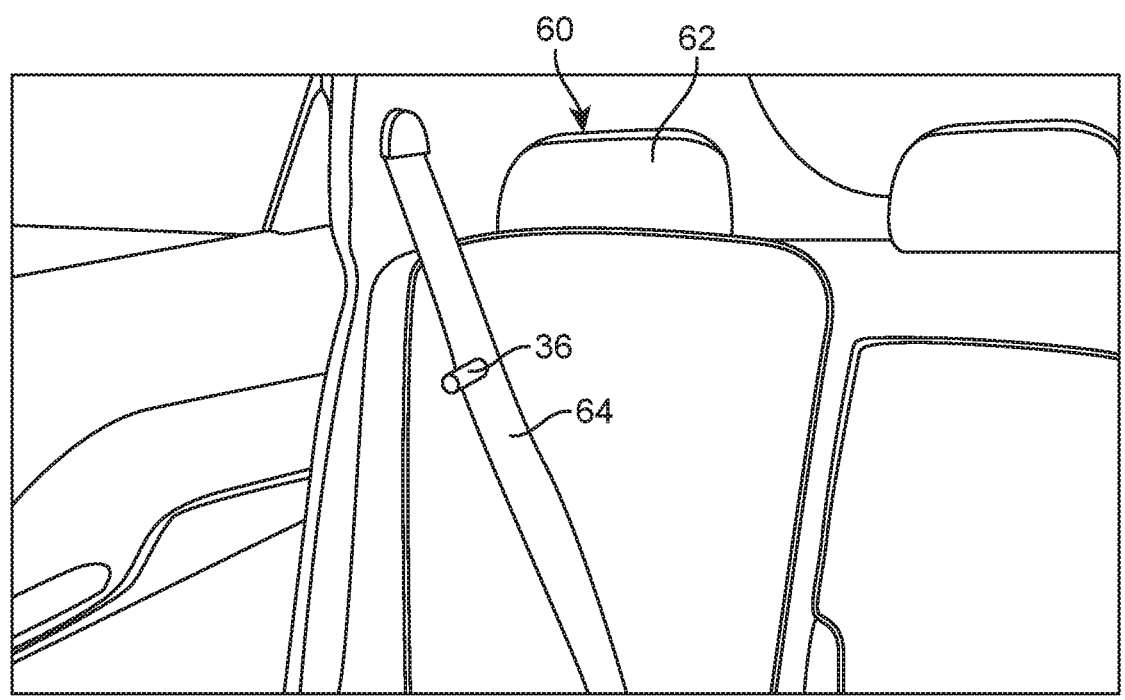
FIG. 4 is a representation of a zoomed view of seat belt 64 with the male member 36 attached.

Neck rest 10 may further be secured to seat belt 64 with a locking mechanism that helps to keep neck rest 10 secured in place even as user U moves. Cushion assembly 20 may further include a female member 34 and a male member 36, which correspond with one another. Female member 34 may preferably be located on lateral sides of cushion 22 as seen on FIG. 3. It may be suitable for the present invention to include multiple of female member 34. Female member 34 may be a cavity that receives, engages and secures male member 36 therein. Male member 36 may be removably mounted onto seat belt 64, as best seen in FIG. 4. It may be suitable for male member 36 to be mounted to seat belt 64 with fastening members such as an adhesive, snap buttons, buttons, fasteners, or the like. Male member 36 may extend outwardly and away from seat belt 64. Male member 36 may be inserted into female member 34 to keep neck rest 10 in position as necessary. It is to be understood, that female member 34 and male member 36 may also be referred to as a stopper for locking the present invention in place.

Neck rest 10 may further include noise assembly 40. Noise assembly 40 may be used to for noise or music generating features of the present invention. The noises or music making features of the present invention may be used to soothe or comfort user U during usage of the present invention. Noise assembly 40 may help user U to fall asleep or remain asleep while in car seat 62. It is to be understood that the present invention may further be just secured to seat belt 64 in a vehicle as well. Usage of car seat 62 may be optional.

Noise assembly 40 may include a speaker 42, a microcontroller 44 and a battery 46. It is to be understood that speaker 42, microcontroller 44 and battery 46 may be interconnected by electrical wires as known in the art. Speaker 42, may preferably, be partially recessed within cushion 22 above of legs 24 and near arms 26. As best seen in FIG. 2, speaker 42 may be at a torso of the stuffed animal. However, it to be understood that speaker 42 may be mounted at a predetermined location on cushion 22. Preferably, microcontroller 44 and battery 46 may be within cushion 22. Power and energy for speaker 42 and microcontroller 44 may come from battery 46. It may be suitable for battery to be replaceable and disposable. In an alternate embodiment, it may be suitable for battery 46 to be rechargeable. Upon noise assembly 40 being activated speaker 42 may emit sounds such as predetermined sayings, songs or melodies to comfort user U. The sounds emitted from speaker 42 may be active for a predetermined length of time. Microcontroller 44 may receive a signal that there is a need to emit sounds. Once microcontroller 44 receives the signal then speakers 42 may be activated. In one embodiment, there may be volume controls on the present invention to control the loudness of the sounds emitted from speaker 42. It also may be suitable for noise assembly 40 to include at least one sensor to activate speaker 42 with a touch or press of the present invention.

Figure 5:
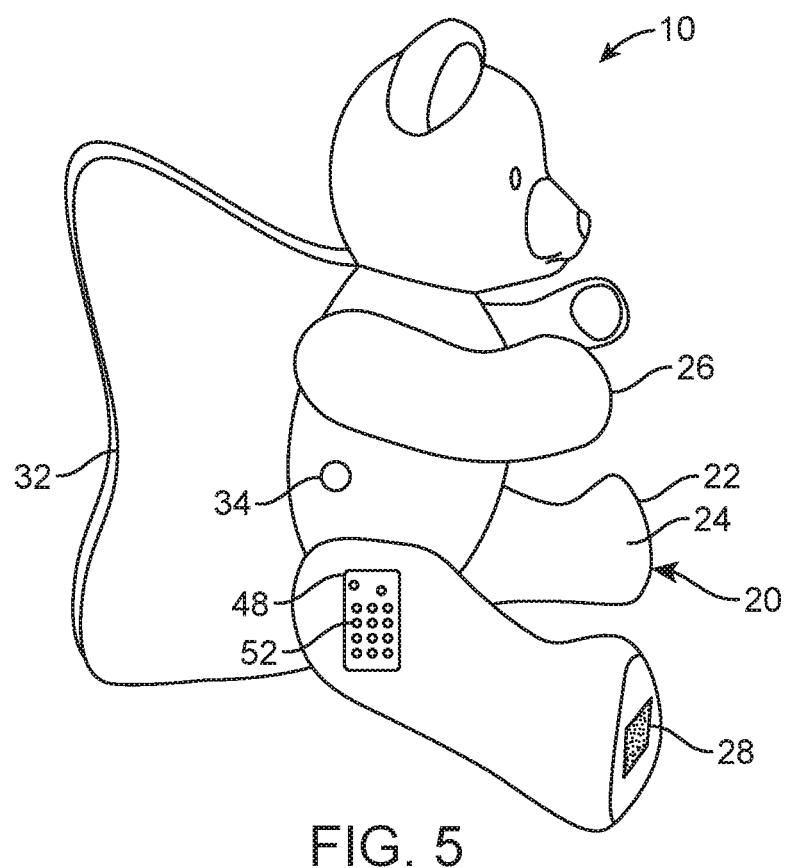
FIG. 5 represents a side view of the neck rest 10 showing remote 28 mounted thereto.
Figure 6:
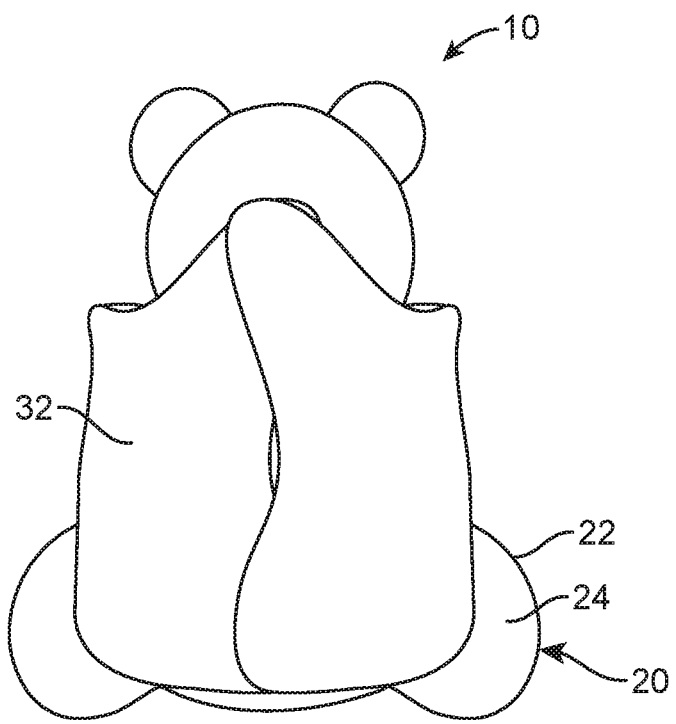
FIG. 6 shows an isometric rear view of the neck rest 10 with folding portions 32 folded and overlapping one another.

Noise assembly 40 may further include a remote 48 with a plurality of buttons 52. Remote 48 may be used to control speaker 42 by communicating with microcontroller 44. Remote 48 may be removably mounted onto cushion 22 as best seen in FIG. 5. Remote 48 may include hook and loop fasteners 28 on a rear side to attach to cushion 22, in one embodiment. Remote 48 may use buttons 52 to control specific actions of speaker 42. Buttons 52 may control power on/off and volume of speaker 42. Buttons 52 may suitably also control what sound is emitted from speaker 42. One of buttons 52 may correspond with music, another of buttons 52 may corresponds with sayings and yet another of buttons 52 may correspond with melodies. User U or the guardian may press or select the desired of buttons 52 to achieve the desired action from speaker 42. It is to be understood that remote 48 may include remote batteries to operate and function properly.

The present invention may help to provide comfort to user U during travel in vehicles. User U may be able to more comfortably fall asleep during travel with the present invention. Neck rest 10 may be removably secured to seat belt 64 of a vehicle or of car seat 62. Neck rest 10 may be secured to seat belt 64 with female member 34 and male member 36. Neck rest 10 may be further secured by folding portions 32 which may overlap and attach to seat belt 64 as well. Cushion 22 may be mounted about the head of user U. Legs 24 may further be used to secure cushion 22. Legs 24 may be secured together underneath of the chin of user U. Afterwards; user U may then get comfortable and have support for their head and neck as user U sleeps. For added comfort, user U may have sounds played which may help to soothe user U as user U falls asleep. User U can then sleep or rest comfortably, while having proper neck support to avoid aches and pains even after prolonged periods of time.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a neck rest, consisting:
   a. a cushion assembly including a cushion, said cushion being a stuffed animal having arms and legs, said legs having hook and loop fasteners at a distal end thereof, said cushion further including a stopper, said stopper defined by a male member and a female member, said female member being on a lateral side of said cushion, said further including folding portions mounted to said cushion, said folding portions including an expanded configuration and a folded configuration, said folding portions extending outwardly and away from said cushion on lateral sides of said cushion in the expanded configuration, said folding portions fold rearwardly to engage said seat belt, said folding portion fold forwardly to fully cover said legs arms and a central portion of said cushion, said folding portions have a curved shape that conforms with the shape of a pair of wings, said folding portions include additional of said hook and loop fasteners, said hook and loop fasteners being on a front side of one of folding portions, additional of said hook and loop fasteners being on a rear side of the remaining of said folding portions, said legs secured together with said hook and looper fasteners underneath the chin of said user;

b. a noise assembly including a speaker, a microcontroller, a battery and a remote, said battery, said microcontroller and said speaker being interconnected with each other, said speaker emitting sounds to soothe said user, said sounds being one of a saying, melody or song, said microcontroller activates said speaker upon said microcontroller receiving a signal from said remote, said remote includes a plurality of buttons to control said speaker, said plurality of buttons controlling the volume, selected sound and power of said speaker, said remote being removably mounted to a side of said cushion, said remote being vertical, said speaker being centrally mounted on said cushion, said battery and said microcontroller being within said cushion; and c. a seat assembly including a car seat with a seat belt, said male member removably mounted onto said seat belt, said male member received within said female member to secure said cushion to said seat belt, when said folding portions are in the folded configuration said hook and loop fasteners on said folding portions cooperate with one another to maintain said folding portions secured about said seat belt when said folding portions are in said folded configuration, said folding portion overlap in said folded configuration, said cushion, said arms and said legs providing support and comfort to the head and neck of the user.

2. The system of claim 1, wherein said folding portions include additional of said hook and loop fasteners, said hook and loop fasteners being on a front side of one of folding portions, additional of said hook and loop fasteners being on a rear side of the remaining of said folding portions.

3. The system of claim 1, wherein said hook and loop fasteners on said folding portions cooperate with one another to maintain said folding portions secured about said seat belt when said folding portions are in said folded configuration, said folding portion overlap in said folded configuration.

4. The system of claim 1, wherein said microcontroller activates said speaker upon said microcontroller receiving a signal from said remote.

5. The system of claim 1, wherein said sounds being one of a saying, melody or song.

6. The system of claim 1, wherein said remote includes a plurality of buttons to control said speaker, volume, sound, and power of said speaker are controlled with said plurality of buttons.

7. The system of claim 1, wherein said seat assembly further includes a car seat, said seat belt being on said car seat.

8. The system of claim 1, wherein said battery is replaceable.

9. The system of claim 1, wherein said battery is rechargeable.

* * * * *